May 16, 1950 N. KUTCHUKIAN 2,508,116
DEVICE FOR SENSING INDICATING PANELS AS USED
IN PLANNING, DISPATCHING, AND THE LIKE
Filed Feb. 12, 1948 2 Sheets-Sheet 1

INVENTOR
NOURHAN KUTCHUKIAN
BY Haseltine, Lake + Co.
AGENTS

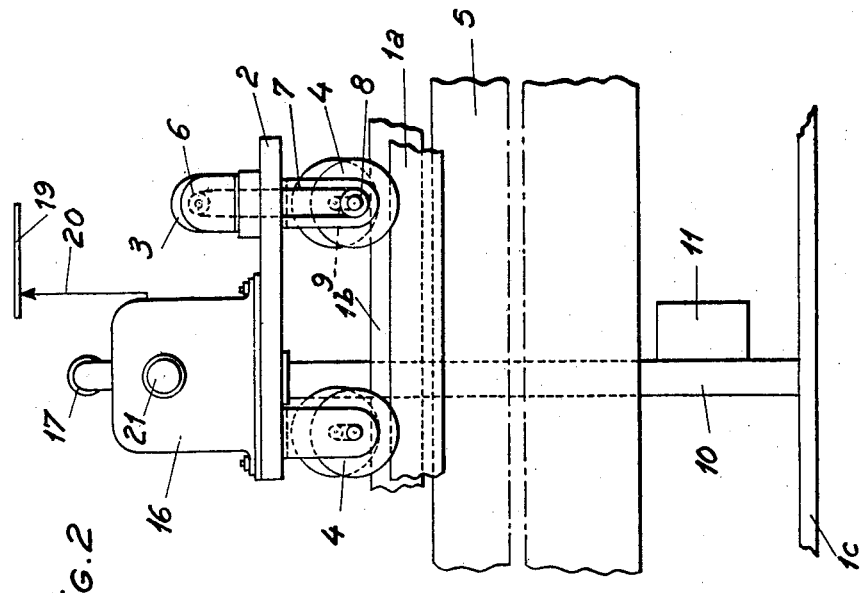
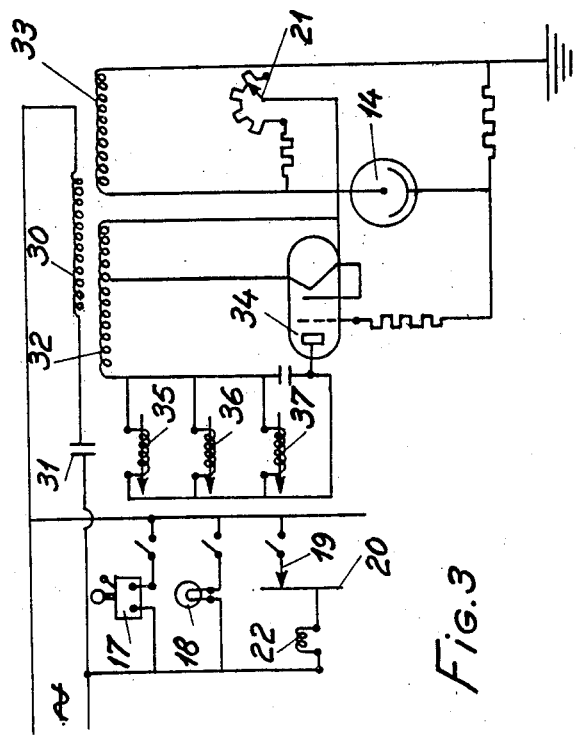

Patented May 16, 1950

2,508,116

UNITED STATES PATENT OFFICE 2,508,116

DEVICE FOR SENSING INDICATING PANELS AS USED IN PLANNING, DISPATCHING, AND THE LIKE

Nourhan Kutchukian, Bois-Colombes, France

Application February 12, 1948, Serial No. 7,913
In France October 22, 1946

8 Claims. (Cl. 250—234)

The present invention relates to devices for sensing indicating panels of various types such as used for planning, dispatching and other purposes, wherein various indications are set down at representative points, the coordinates of which include at least one reference axis graduated in units time.

Said indications are materialized with markers, indicia and the like, in color or in black and white so as to facilitate the readings and references.

The present invention has for main object to provide a sensing device using a light beam and a reading device comprising a photo-electric cell, together carried on a power-shiftable structure movable parallel with the surface of the panel. Displacements of said structure are effected at a predetermined uniform average speed. Reference means or markers carried on the panel at suitable locations thereon project above said surface and intercept the rays of light whenever the projector reaches a position corresponding to a preselected time. This energizes the photo-electric cell and makes it possible to actuate relays and operate a luminous or sound alarm signal or remote control means.

Another object of the invention is to provide, in a sensing device of the character described, a projector so arranged as to deliver a beam of light tangent to the surface of the panel. It is for that purpose mounted at the lower part of a supporting arm rigid with the carriage. The photo-electric cell is supported on said carriage as also is a casing containing auxiliary attachments for said cell such as amplifier and rectifier units, etc.

The above described device is applicable to panels of any shape and any size. Thus, for instance the panel to be sensed, may be planar, cylindrical or it may entirely extend around the walls of a room.

The ensuing disclosure made in reference with the accompanying drawings, given merely by way of indication and not of limitation, will clearly show how the invention will be practically carried out.

In the drawings:

Fig. 2 is a rear view of the apparatus illustrated in Fig. 1.

Fig. 3 shows diagrammatically the electrical circuit connecting the various electrical devices forming the apparatus.

Figure 1:
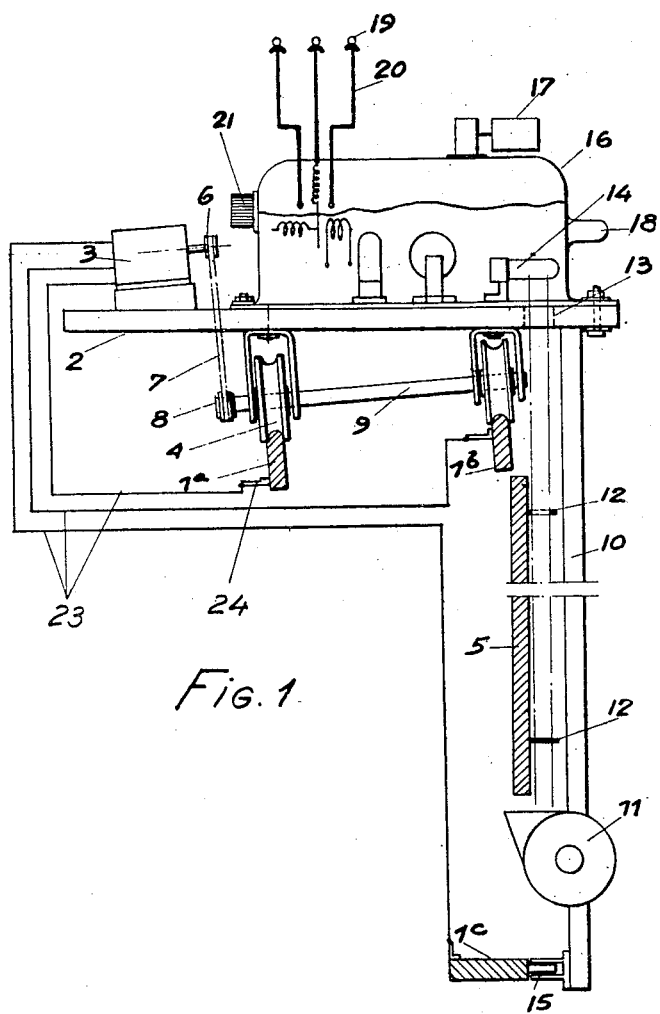
Fig. 1 shows a diagrammatic side view of the apparatus.

The apparatus comprises a fixed structure formed by rails 1 on which rollers 4 are engaged said rollers supporting a carriage 2 driven from a motor 3. The displacements of the cariage 2 are so effected as to be always along a path parallel with the directrix curve of the planar or cylindrical surface of the panel 5 to be sensed.

The rail assembly 1 comprises two rails 1a, 1b, arranged at the top of the panel 5 and a rail 1c at the bottom of said panel. Accuracy in the rolling displacements and stability of the carriage 2 are assured by the raised relative position of the rail 1b with respect to the rail 1a.

The rails 1a, 1b, 1c are made of an electrically conductive material and the rollers 4 and 15 are mounted through insulating supports.

The supporting and guiding rollers 4 for the carriage 2 comprise four electrically insulated rollers, the journal pins of said rollers also being insulated.

The motor 3 may be a synchronous electric motor or any other suitable prime mover having a constant average speed and is supplied with current from the rails 1a and 1b through suitable conductors 23 and contact brakes 24. The drive pulley 6 of said motor actuates a transmission chain 7 which further engages a pulley 8 rigid with the journal pin 9 for one pair of rollers 4 to thereby provide for the traversing movements of the carriage 2 along the rails 1a and 1b at a uniform speed.

The carriage 2 carries an upstanding arm 10 of a length corresponding with the height of the panel 5 and parallel with the generatrices thereof. At the bottom of said arm 10 is a trailing member in which are journalled rollers 15 engaging the rail 1c. This arrangement ensures that the movable structure is properly balanced and is accurately positioned with respect to the panel 5 the accuracy of the positioning being furthermore improved as a result of the oblique setting of the pins 9 which ensure a continual gravity force urging the assembly towards a fixed position.

The bottom of the upright arm 10 carries the projector 11. The projector 11 upwardly delivers a beam of light substantially parallel with the arm 10. This beam of light is tangentially or shavingly directed with respect to the panel 5. It may also be possible so to adjust the beam of light as to cause it to touch the panel along a generatrix of the latter, thereby leaving a luminous trace on said panel.

The aperture of the projector is so adjusted as to produce a beam of light having parallel rays and so that the cross-section of the beam will be a highly elongated rectangle.

After the beam has passed parallel with the generatrices of the panel 5 and in case it has not been stopped by a marker 12 forming an obstacle in its path of travel, the luminous beam will then pass through a window 13 formed in the frame of the carriage.

Beyond said window the beam impinges on the photo-sensitive surface of the cell 14 carried through a suitable support on the carriage 2.

The carriage 2 also supports a casing 16 containing the requisite electronic supplying and amplifying means for operating the photo-electric cell 14. Said casing also contains the relays 35, 36, 37 for operating a sound signal means 17 or an optical signal means 18 or a remote control relay 22, the operation of said relays being caused by the energization of the cell. Outside the illustrated casing is a sound signal device 17 and an optical signal device 18. If required, overhead conductors 19 extending parallel with the rails 1 and trolley members 20 are provided to convey the control current towards members directly operated through remote control relay 22. The carriage 2 also comprises supports for the control and adjusting means such as the potentiometer 21.

As illustrated in Fig. 3 the electrical circuit associated to the photoelectric cell 24 and to the operative devices 17, 18 and 22 comprises a transformer 30, the primary winding of which is protected by a capacitor 31 and provided with a twin-secondary winding 32 and 33. The secondary winding 33 feeds the cell 14 which, when lighted, supplies the grid of a triode 34 acting as amplifier stage for energizing at least one of the relays 35, 36, 37 controlling respectively the sound signal device 17, the optical signal device 18 and the remote control relay 22. The triode 34 is fed by means of the secondary winding 32.

The device operates as follows:

The operator will first have disposed the various markers 12 at suitable locations over the panel 5. The carriage 2 is traversed over the rails 1 at a suitable uniform rate and in this way the light beam issuing from the projector 11 senses the entire surface of the panel 5. At a predetermined instant selected beforehand by the operator the light beam encounters a marker 12 which intercepts the light rays thereof. The photo-electric cell responds to this variation in the light flux received by it and the energization thereof is transmitted to the indicating devices 17 and 18 thus warning the operator that the predetermined instant as determined by said marker, has been reached.

It is obvious that the device could be provided with a plurality of projectors and a plurality of photo-cells sensitized to various luminous wave-lengths emitted by the projectors and that the markers could be formed by suitable filters, thereby enabling selective indications to be obtained corresponding to different warning signal devices or different remote control relays.

Such a device is advantageously applicable to the electric "planning" apparatus described in my patent application Serial No. 693,602, filed August 28, 1946.

In this manner a rational utilization of planning and dispatching panels and graphs, for instance railway traffic graphs is considerably facilitated and the readings and automatic signaling or control operations effected by such apparatus will greatly extend the field in which such panels are capable of being used.

It will also be understood that without exceeding the scope of the invention, alterations may be made in the forms of embodiment described above and in particular, the markers secured to the panel may comprise a prism or mirror whereby they may be caused to light up in a readily visible manner whenever they are impinged upon by the light beam from the projector so as to facilitate identification thereof.

What I claim as my invention and desire to secure by Letters Patent is:

1. A sensing device for cylindrical or planar panels such as used in planning, dispatching and the like for remotely controlling at preselected times operators or devices according to data appropriated to each of said operators or devices, comprising, in combination, at least one marker for each extraneous operator or device secured on the panel for materializing any data appropriated to said operator or device, said markers protruding from said panel at preselected points one coordinate of which is determined according to an axis calibrated in units of time and parallel with the directrix of the panel surface, a power driven frame the dimension of which measured parallelly to the generatrices of said surface is greater than the corresponding dimension of said panel for projecting beyond each edge thereof parallel with said directrix, drive means carried by said frame for driving the same at uniform speed, means for guiding said power driven frame along a path parallel with said axis, and an assembly supported by said frame and including at least one source of radiation for transmitting a radiation beam tangential with said generatrices, for each source of radiation an element sensitive to radiation actuatable by said source, said element and the corresponding source being located on a line parallel with said generatrices, one on one part of said frame projecting beyond one side of said panel and the other on the other projecting part of said frame, and means controlled by said elements for remotely controlling said operators or devices at the preselected times according to the datum corresponding to each marker when one of said radiation beams is intercepted by said marker during the uniform displacement of said frame.

2. A sensing device for cylindrical or planar panels such as used in planning, dispatching and the like for remotely controlling at preselected times operators or devices according to data appropriated to each of said operators or devices, comprising, in combination, at least one opaque marker for each extraneous operator or device secured on the panel for materializing any data appropriated to said operator or device, said markers protruding from said panel at preselected points one coordinate of which is determined according to an axis calibrated in units of time and parallel with the directrix of the panel surface, a power driven frame the dimension of which measured parallelly to the generatrices of said surface is greater than the corresponding dimension of said panel for projecting beyond each edge thereof parallel with said directrix, drive means carried by said frame for driving the same at uniform speed, means for guiding said power driven frame along a path parallel with said axis, and an assembly supported by said frame and including at least one projector for transmitting a light beam tangential with said generatrices, for each projector a photo-sensitive cell actuatable by said projector, said cell and the corresponding projector being located on a line parallel with said generatrices, one on one part of said frame projecting beyond one side of said panel and the other on the other projecting part of said frame, and means controlled by said cells for remotely controlling said operators or devices at the preselected times according to the datum corresponding to each marker when one of said light beams is intercepted by said marker during the uniform displacement of said frame.

3. A sensing device, according to claim 2, wherein the projectors transmit light beams having different wave-lengths, the markers being made with optical filters, each of them being transparent for a predetermined luminous wavelength, and each of the cells being responsive to one only of said predetermined wave-lengths.

4. A sensing device for cylindrical or planar panels such as used in planning, dispatching and the like for remotely controlling at preselected times operators or devices according to data appropriated to each of said operators or devices, comprising, in combination, at least one opaque marker for each extraneous operator or device secured on the panel for materializing any data appropriated to said operator or device, said markers protruding from said panel at preselected points one coordinate of which is determined according to an axis calibrated in units of time and parallel with the directrix of the panel surface, a power driven frame the dimension of which measured parallelly to the generatrices of said surface is greater than the corresponding dimension of said panel for projecting beyond each edge thereof parallel with said directrix, drive means carried by said frame for driving the same at uniform speed, means for guiding said power driven frame along a path parallel with said axis, and an assembly supported by said frame and including at least one projector for transmitting a light beam tangential with said generatrices, for each projector a photo-sensitive cell actuatable by said projector, said cell and the corresponding projector being located on a line parallel with said generatrices, one on one part of said frame projecting beyond one side of said panel and the other on the other projecting part of said frame, at least an electrical relay connected with at least one of said cells, and means controlled by said relays for remotely controlling said operators or devices at the preselected times according to the datum corresponding to each marker when one of said light beams is intercepted by said marker during the uniform displacement of said frame.

5. A sensing device for cylindrical or planar panels such as used in planning, dispatching and the like for remotely controlling at preselected times operators or devices according to data appropriated to each of said operators or devices, comprising, in combination, at least one light projecting marker for each extraneous operator or device secured on the panel for materializing any data appropriated to said operator or device, said markers protruding from said panel at preselected points one coordinate of which is determined according to an axis calibrated in units of time and parallel with the directrix of the panel surface, a power driven frame the dimension of which measured parallelly to the generatrices of said surface is greater than the corresponding dimension of said panel for projecting beyond each edge thereof parallel with said directrix, drive means carried by said frame for driving the same at uniform speed, means for guiding said power driven frame along a path parallel with said axis, and an assembly supported by said frame and including at least one projector for transmitting a light beam tangential with said generatrices, for each projector a photo-sensitive cell actuatable by said projector, said cell and the corresponding position being located on a line not parallel with said generatrices, one on one part of said frame projecting beyond one side of said panel and the other on the other projecting part of said frame, whereby the corresponding light beam does not act on said cell, and means controlled by said cells for remotely controlling said operators or devices at the preselected times according to the datum corresponding to each marker when one of said light beams is reflected on the corresponding cell by said marker during the uniform displacement of said frame.

6. A sensing device for cylindrical or planar panels such as used in planning, dispatching and the like for remotely controlling at preselected times operators and devices according to data appropriated to each of said operators and devices, comprising, in combination, at least one marker for each extraneous operator and device secured on the panel for materializing any data appropriated to said operator or device, said markers protruding from said panel at preselected points one coordinate of which is determined according to an axis calibrated in units of time and parallel with the directrix of the panel surface, a power driven frame the dimension of which measured parallelly to the generatrices of said surface is greater than the corresponding dimension of said panel for projecting beyond each edge thereof parallel with said directrix, drive means carried by said frame for driving the same at uniform speed, means for guiding said power driven frame along a path parallel with said axis, and an assembly supported by said frame and including at least one source of radiation for transmitting a radiation beam tangential with said generatrices, for each source of radiation an element sensitive to radiation actuatable by said source, said element and the corresponding source being located on a line parallel with said generatrices, one on one part of said frame projecting beyond one side of said panel and the other on the other projecting part of said frame, signalling means for remotely warning said operators, means for remotely controlling said devices, and electrical relays controlled by said elements for actuating respectively said signalling means and said remote control means at the preselected times when one of said radiation beams is intercepted by the marker materializing the corresponding datum during the uniform displacement of said frame.

7. A sensing device for cylindrical or planar panels such as used in planning, dispatching and the like for remotely controlling at preselected times operators or devices according to data appropriated to each of said operators or devices, comprising, in combination, at least one marker for each extraneous operator or device secured on the panel for materializing any data appropriated to said operator or device, said markers protruding from said panel at preselected points one coordinate of which is determined according to an axis calibrated in units of time and parallel with the directrix of the panel surface, a power driven frame the dimension of which measured parallelly to the generatrices of said surface is greater than the corresponding dimension of said panel for projecting beyond each edge thereof parallel with said directrix, a plurality of rails parallel with the surface of said panel and located in at least one plane parallel to said time axis, a drive motor carried by said frame for traversing the same along said rails at uniform speed, a plurality of rollers pivoted on said frame for engaging said rails, one pair at least of which is connected with said motor, and an assembly supported by said frame and including at least one source of radiation for transmitting a radiation beam tangential with said generatrices, for each source of radiation an element sensitive to radiation actuatable by said source, said element and the corresponding source being located on a line parallel with said generatrices, one on one part of said frame projecting beyond one side of said panel and the other on the other projecting part of said frame, and means controlled by said elements for remotely controlling said operators or devices at the preselected times according to the datum corresponding to each marker when one of said radiation beams is intercepted by said marker during the uniform displacement of said frame.

8. A sensing device for cylindrical or planar panels such as used in planning, dispatching and the like for remotely controlling at preselected times operators or devices according to data appropriated to each of said operators or devices, comprising, in combination, at least one marker for each extraneous operator or device secured on the panel for materializing any data appropriated to said operator or device, said markers protruding from said panel at preselected points one coordinate of which is determined according to an axis calibrated in units of time and parallel with the directrix of the panel surface, two rails arranged near the upper edge of said surface parallel with said directrix and slightly displaced with respect to each other in vertical height, a guide rail arranged near the lower edge of said surface parallel with said directrix, the curvature of said rails being parallel with said time axis, a motor driven carriage projecting beyond said upper edge, a drive motor carried by said carriage for traversing the same along said two rails at uniform speed, a plurality of pairs of rollers pivoted on said carriage one pair at least of which is connected with said motor, pins carrying each pair of said rollers having an oblique setting for engaging each of said pairs with said two rails, a supporting arm parallel with the generatrices of said surface, carried by said carriage and directed towards said lower edge for projecting beyond the same, rollers carried by said arm for engaging said guide rail, the obliquity of the upper rails being determined with respect to the position of the center of gravity of the unit formed by said carriage and said arm, and an assembly supported by said unit and including at least one source of radiation for transmitting a radiation beam tangential with said generatrices, for each source of radiation an element sensitive to radiation actuatable by said source, said element and the corresponding source being located on a line parallel with said generatrices, one on one part of said unit projecting beyond one side of said panel and the other on the other projecting part of said unit, and means controlled by said elements for remotely controlling said operators or devices at the preselected times according to the datum corresponding to each marker when one of said radiation beams is intercepted by said marker during the uniform displacement of said unit.

NOURHAN KUTCHUKIAN.

REFERENCES CITED

The following references are of record in the file of this patent:

UNITED STATES PATENTS

| Number | Name | Date |
|---|---|---|
| 1,821,029 | Peter | Sept. 1, 1931 |
| 1,880,149 | Neale | Sept. 27, 1932 |
| 2,181,778 | Ball | Nov. 28, 1939 |
| 2,309,329 | Powers | Jan. 26, 1943 |